United States Patent [19]
Goto et al.

[11] Patent Number: 4,782,709
[45] Date of Patent: Nov. 8, 1988

[54] ELECTROMAGNETIC FLOWMETER

[75] Inventors: Tsutomu Goto, Tokyo; Yoshiro Tanaka, Isehara; Sakae Ishikawa, Yokohama, all of Japan

[73] Assignee: Yamatake-Honeywell Co., Ltd., Tokyo, Japan

[21] Appl. No.: 891,005

[22] Filed: Jul. 25, 1986

[30] Foreign Application Priority Data

Aug. 19, 1985 [JP] Japan ............... 60-180423
Aug. 19, 1985 [JP] Japan ............... 60-180424
Aug. 19, 1985 [JP] Japan ............... 60-180425
Aug. 19, 1985 [JP] Japan ............. 60-125716[U]

[51] Int. Cl.$^4$ ............................................. G01F 1/58
[52] U.S. Cl. ............................................. 73/861.12
[58] Field of Search ................... 73/861.12; 310/11

[56] References Cited

U.S. PATENT DOCUMENTS 4,507,975 4/1985 Bittner et al. ................ 73/861.12

FOREIGN PATENT DOCUMENTS 1121347 1/1962 Fed. Rep. of Germany ... 73/861.12
2417022 10/1975 Fed. Rep. of Germany ... 73/861.12

OTHER PUBLICATIONS

Japanese Patent Laid-open Specification No. Sho 58-501552, 1983.

Primary Examiner—Charles A. Ruehl
Attorney, Agent, or Firm—Townsend & Townsend

[57] ABSTRACT

In an electromagnetic flowmeter using a ceramic pipe as a measuring pipe, an electrode inserted in the ceramic pipe includes a ceramic core rod and a conductive portion of a refractory metal. The conductive portion covers a fluid contact end face of the core rod and extends along the longitudinal direction of the core rod. The other end of the conductive portion faces an outer surface of the ceramic pipe, and is opposite the fluid contact end face.

22 Claims, 6 Drawing Sheets

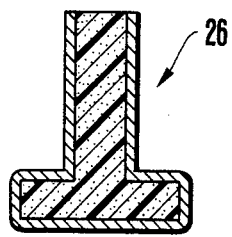
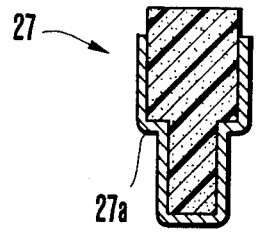
FIG.6   FIG.7
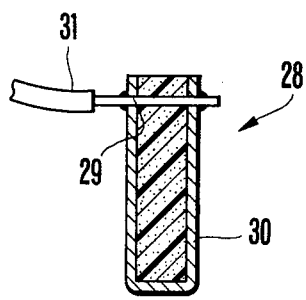
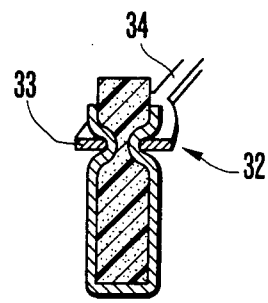
FIG.8   FIG.9

ELECTROMAGNETIC FLOWMETER

BACKGROUND OF THE INVENTION

The present invention relates to an electromagnetic flowmeter and, more particularly, to an electromagnetic flowmeter using a ceramic electromagnetic flowmeter measuring pipe.

Electromagnetic flowmeters utilize the Faraday's electromagnetic induction rule and have been popular in a variety of applications which require an output proportional to a flow rate, as well as measurements independent of flow states and fluid constants, and free from pressure loss. In such an electromagnetic flowmeter, a stainless pipe as a nonmagnetic pipe is used as a measuring pipe, and an insulating material such as that sold under the trademark Teflon is coated as a lining on the inside of the pipe. However, the measuring pipe with Teflon lining is expensive and fabrication thereof is complicated. Therefore, ceramic measuring pipes have been in widespread use in recent years.

PCT No. W083/0200 describes such a ceramic measuring pipe. The pipe has coupling flanges at two ends. Radial holes are formed in a direction perpendicular to the coils arranged around the central portion of the outer surface of the pipe. Electrodes are inserted in these holes and the measuring pipe is sintered to fix the electrodes.

In this case, since the measuring pipe is sintered while the electrodes are inserted in the holes, the electrode material must withstand the sintering temperature of ceramic and must have substantially the same thermal expansion coefficient as that of the ceramic. Platinum is an electrode material which satisfies these conditions. However, platinum is expensive and causes an increase in total cost. In order to reduce the cost, it is possible to reduce the electrode diameter. However, an input impedance of an electromagnetic flowmeter converter is increased to adversely affect the operation characteristics of the electromagnetic flowmeter.

In order to solve this problem, a conductive ceramic material can be used as the electrodes. However, such a material normally has a lower electric conductivity than that of a metal, thereby decreasing a detection output level and degrading the operation characteristics of the electromagnetic flowmeter.

SUMMARY OF THE INVENTION

It is, therefore, a principal object of the present invention to provide an inexpensive electromagnetic flowmeter having desired operation characteristics, and a method of manufacturing the same.

It is another object of the present invention to provide an electromagnetic flowmeter wherein the diameter of electrodes inserted in a measuring pipe can be increased without degrading the operation characteristics of the electromagnetic flowmeter.

In order to achieve the above objects of the present invention, there is provided an electromagnetic flowmeter using a ceramic pipe as a measuring pipe, wherein an electrode inserted in the ceramic pipe comprises: a ceramic core rod; and a conductive portion of a refractory metal, the conductive portion being adapted to cover a fluid contact end face of the core rod and to extend along a longitudinal direction of the core rod, the other end of the conductive portion facing an outer surface of the ceramic pipe, and the other end being opposite the fluid contact end face.

BRIEF DESCRIPTION OF THE DRAWINGS

FIGS. 2 to 21 are respectively sectional views showing modifications of the electromagnetic flowmeter according to the present invention.

DESCRIPTION OF THE PREFERRED EMBODIMENT

Figure 1:
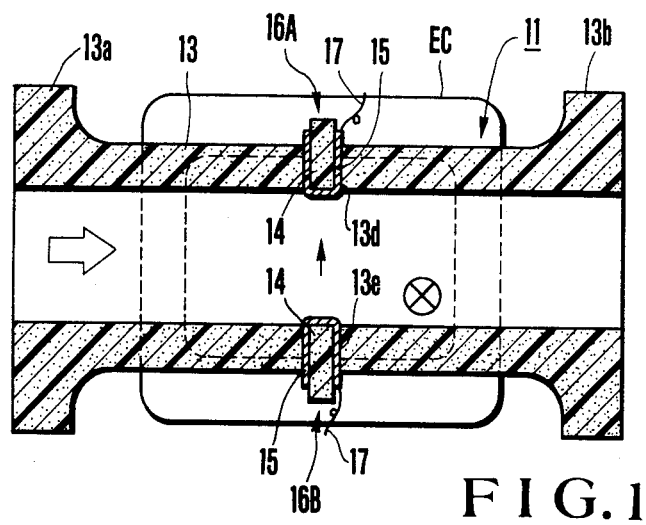
FIG. 1 is a sectional view of an electromagnetic flowmeter according to an embodiment of the present invention.

FIG. 1 shows an embodiment of an electromagnetic flowmeter according to the present invention, and more particularly, a measuring portion including electrodes and excitation coils.

Referring to FIG. 1, a measuring portion 11 of the electromagnetic flowmeter includes coupling flanges 13a and 13b at ends thereof. Electrode mounting holes 13d and 13e are radially formed in the opposite wall portions of the axial central portion of a measuring pipe 13. Electrodes 16A and 16B characterized by the present invention are respectively fitted in the holes 13d and 13e. The electrodes 16A and 16B have an identical structure. Each electrode comprises an electrode core rod 14 and a metal conductive portion 15. The conductive portion 15 has a cup-like shape, with a bottom so as to cover the outer surface and the end face of the electrode (corresponding to the interior of the measuring pipe). These electrodes are supported by appropriate known support members which are omitted since they are not directly associated with the present invention. Only signal lead wires 17 connected to a terminal block (not shown) are illustrated in FIG. 1. One end of each of the lead wires 17 is soldered or brazed with a corresponding one of the exposed parts of the conductive portions 15 of the electrodes 16A and 16B. A brazing material is normally silver. However, platinum can be used in favor of its anticorrosion properties. The material of the conductive portion 15 is preferably a refractory metal (e.g., platinum or a platinum-iridium alloy having a higher melting point than a ceramic sintering temperature (about 1,000° C. to 1,600° C.) during the fabrication of the measuring pipes. However, if the ceramic sintering temperature is low, the material of the conductive portion 15 may be copper or iron. It should be noted that the platinum-iridium alloy has a higher hardness than that of platinum. The platinum-iridium alloy preferably consists of 90 wt. % of platinum and 10 wt. % of iridium.

The conductive portions 15 constituting the electrodes 16A and 16B are tightly fitted in the holes 13d and 13e of the ceramic pipe 13, respectively. More specifically, the conductive portions 15 are respectively formed on the distal end faces of the sintered ceramic core rods 14 and on the outer surfaces thereof continuous with the distal end faces. The core rods 14, each having the conductive portion, are respectively inserted in the holes 13d and 13e and are set in the positions shown in FIG. 1, i.e., in positions where the distal ends of the conductive portions 15 face inner wall surface portions of the ceramic pipe 13. In this case, the ceramic pipe 13 is not sintered or is semi-sintered. When ceramic pipe 13 is sintered, it shrinks and clamps the conductive portions 15. Therefore, the ceramic pipe 13 can be coupled to the conductive portion to provide a sufficient seal therebetween.

Referring to FIG. 1, substantially inverted U-shaped excitation coils EC are mounted on the outer surface of the ceramic pipe 13 in a direction perpendicular to the alignment of the electrodes 16A and 16B. Thick arrow "⇨" in FIG. 1 represents the flowing direction of a fluid, mark "(X)" represents the direction of a magnetic field generated by the excitation coils EC, and arrow "→" represents the direction of current supplied between the electrodes 16A and 16B. A method of manufacturing a measuring pipe with the electrodes 16A and 16B will be described below.

A platinum paste is applied to the end faces and outer surfaces of the sintered ceramic electrode core rods 14 and is sintered at a temperature of 800° to 1,600° C. In other words, a surface treatment of the core rods 14 is performed with a refractory metal to prepare the electrodes 16A and 16B. The electrodes 16A and 16B are respectively inserted in the holes 13d and 13e of the non-sintered or semi-sintered ceramic pipe 13, and the ceramic pipe 13 is sintered at a temperature of 1,000° to 1,600° C., thus preparing the electromagnetic flowmeter measuring pipe 11 with the electrodes 16A and 16B.

In the fabrication process of the electromagnetic flowmeter measuring pipe 11, the sintered ceramic electrode core rods 14 are used to prepare the electrodes 16A and 16B. The sintered ceramic core rods 14 are used for the following reason. If non-sintered ceramic core rods are used, i.e., inserted in the holes 13d and 13e, and sintered, the core rods shrink excessively and are loosened. In order to prevent this problem, a sintered ceramic material is used. However, if a ceramic material has a small shrinkage rate, semi-sintered ceramic core rods may be used. In other words, if the ceramic electrode core rods have a high semi-sintering temperature compared with that of the ceramic pipe 13, the above problem does not occur.

According to the method described above, since the ceramic electrode core rods 14 are surface-treated with the refractory metal to prepare the electrodes 16A and 16B, the amount of metal used can be reduced. In addition, the diameter of the electrodes can be increased to guarantee a low impedance required in the electrodes, and the electrodes 16A and 16B can be tightly fitted in the holes 13d and 13e of the ceramic pipe 13. Therefore, the small amount of metal used reduces the total cost. Since the electrodes 16A and 16B and the ceramic pipe 13 are sintered after the sintered ceramic electrode core rods 14 are respectively inserted in the holes 13d and 13e in the non-sintered or semi-sintered ceramic pipe 13, the shrinkage rate of the ceramic pipe 13 is larger than that of the electrodes 16A and 16B. The amount of the metal used for the electrodes is small and the same material for the measuring pipe can be used as the core rods. Alternatively, a material having a linear expansion coefficient near that of the measuring pipe may be used as the core rods. Therefore, the thermal expansion coefficient of the electrodes can be substantially the same as that of the measuring pipe, and the sealing property will not be degraded even if a temperature change occurs.

Figure 2:
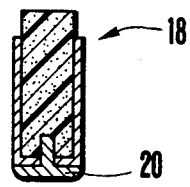
Figure 3:
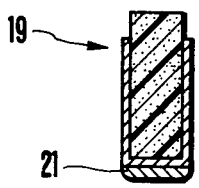
Figure 4:
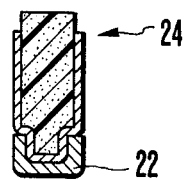
Figure 5:
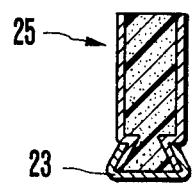

According to the present invention, as shown in FIGS. 2 and 3, a T-shaped tip 20 and a plate-like conductive tip 21, both of which serve as platinum or platinum-iridium alloy conductive heads, can be respectively brazed at the distal end faces, i.e., measuring fluid contact surfaces of electrodes 18 and 19. The conductive tips can be selected according to the properties of the measuring fluid. For example, if a fluid to be measured is a corrosive fluid, an anticorrosion material is selected for the conductive tips. Conductive caps 22 and 23 of the structures shown in FIGS. 4 and 5 can be used in place of the conductive tips 20 and 21, respectively. The conductive caps 22 and 23 are fitted on the projections of electrodes 24 and 25, respectively. In this case, the conductive caps 22 and 23 are respectively brazed with and caulked to the measuring fluid sides of the electrodes 24 and 25. In brazing for the structure shown in FIG. 4, when a soldering cream or a bonding film is used, better workability can be achieved.

The electrode core rods used in the above embodiment and its modifications can be tooled with variations. For example, as shown in FIG. 6, a stepped electrode 26 may be used to increase a contact surface area with the fluid to be measured. As shown in FIG. 7, an electrode 27 may have an electrode positioning step 27a. The step 27a in FIG. 7 may be tapered.

In the above embodiment, the signal lead wire 17 is simply connected to the corresponding conductive portion 15 of the electrode. However, as shown in FIG. 8, a signal lead wire 31 may be connected to a conductive portion 30 through a hole 29 formed in an electrode 28. Alternatively, as shown in FIG. 9, a signal lead wire 34 may be fitted in a lock portion 33 formed in an electrode 32, thereby achieving a perfect connection between the lead wire and the conductive portion.

FIGS. 10 to 17 show modifications showing the connections between the electrodes and the lead wires connected thereto, respectively.

Figure 10:
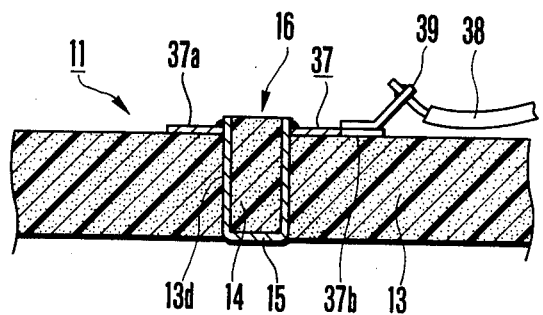

The same reference numerals as in FIGS. 1 to 9 denote the same parts in FIG. 10. Referring to FIG. 10, an electrode 16 is fitted in a hole 13d formed in a ceramic pipe 13. The electrode 16 consists of a ceramic electrode core rod 14 and a metal conductive portion 15 which covers the outer surface and the insertion end face (the portion which falls inside the measuring pipe) of the core rod 14. The non-sintered or semi-sintered electrode core rod 14 covered with the metal conductive portion 15 is inserted in the hole 13d of the ceramic pipe 13. The electrode 16 is sintered together with the ceramic pipe 13 and is fixed thereto. In this case, the outer end of the electrode 16 is exposed outside the outer surface of the ceramic pipe 13. A lead wire connecting piece 37 is brazed or soldered with the conductive portion 15 formed on the outer surface of the electrode core rod 14. In this case, the lead wire connecting piece 37 includes a ring 37a and a connecting tongue 37b extending outward from the ring 37a. The ring 37a is fitted on the extended portion of the core rod 14 and is soldered while the lower surface of the ring 37a is in contact with the outer surface of the ceramic pipe 13. The lead wire connecting piece 37 may be formed by metallizing part of the outer surface of the ceramic pipe 13. One end of a signal lead wire 38 is connected to the lead wire connecting piece 37 through a terminal plate 39.

Figure 11:
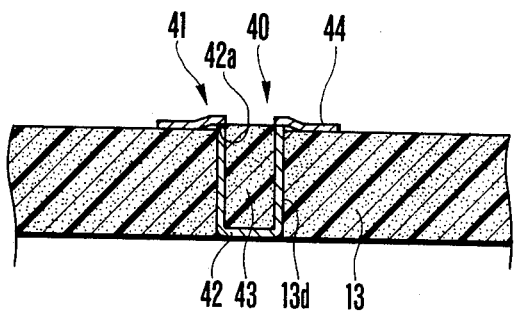

As shown in FIG. 10, the lead wire connecting piece 37 is soldered or brazed with the metal conductive portion 15 constituting part of the electrode 16. However, an electrode 40 may be formed, as shown in FIG. 11. In this case, an end portion 42a of a ceramic core rod 43, which is near the outer surface of the ceramic pipe 13, is set at substantially the same level as that of the outer surface of the ceramic pipe 13, and a refractory metal is used to cover the peripheral portion of the end portion 42a to constitute a lead wire connecting piece 44. Thus, soldering or brazing can be omitted.

Figure 12:
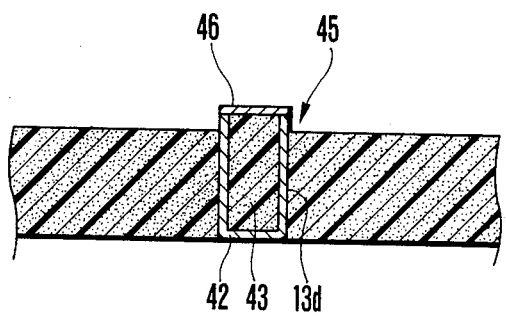

FIG. 12 shows a modification of FIG. 11. A lead wire connecting piece 46 to be connected to a metal conductive portion 42 constituting an electrode 45 is formed on the end face of a core rod 43 constituting an electrode 45 extending outside a ceramic pipe 13. The same effect as in FIG. 11 can be obtained in FIG. 12.

Figure 13:
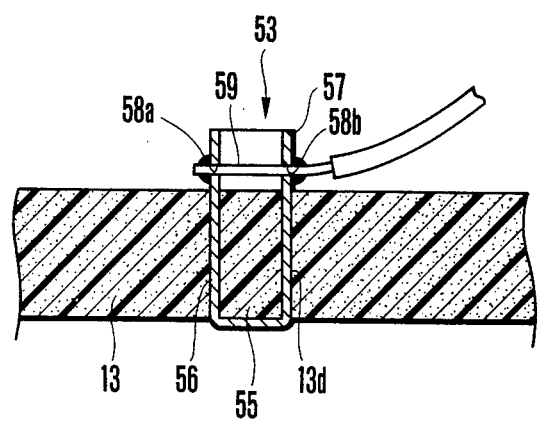

FIG. 13 shows another modification of FIG. 11. An electrode 53 in FIG. 13 consists of a sintered or semi-sintered ceramic core rod 55, and a conductive portion 56, i.e., a cylindrical cap with a bottom, made of a 0.5-mm thick refractory conductive metal member which covers the distal end face and outer surface of the ceramic core rod 55. The electrode 53 is inserted in a hole 13d formed in a non-sintered or semi-sintered ceramic pipe 13. In this state, the electrode 53 is sintered together with the ceramic pipe 13 and is fixed thereto. The outer extended end of the conductive portion 56 of the electrode 53 extends outward from the outer surface of the ceramic core rod 55 to constitute a lead connecting portion 57. A lead 59 of a signal lead wire is inserted through holes 58a and 58b formed in opposite wall surfaces of the connecting portion 57. The lead 59 is soldered with the connecting portion 57 around the holes 58a and 58b. Soldering is performed after the ceramic pipe 13 is sintered. Platinum or a platinum-iridium alloy having a higher melting point than the ceramic sintering temperature of the pipe 13 can be used as a refractory metal for the conductive portion 56 of the electrode 53. In the modification in FIG. 13, the holes 58a and 58b can be formed in the connecting portion 57 of the electrode 53 before or after the ceramic pipe 13 is sintered. Therefore, the electrode structure can be simplified compared with the conventional electrode structure.

Figure 14:
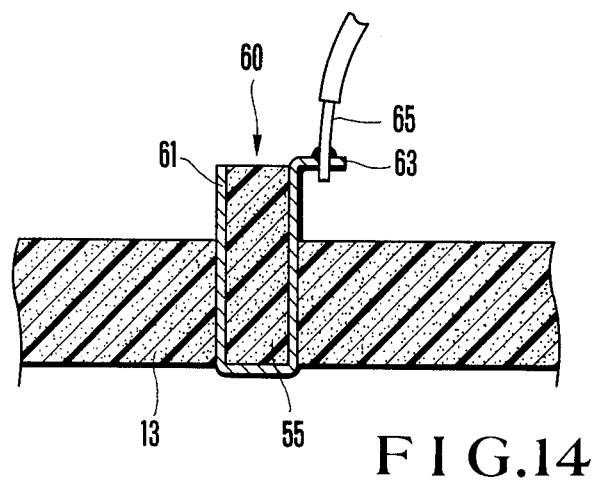

FIG. 14 shows a modification of FIG. 13. A lead connecting tongue 63 is formed at an outer end of a conductive portion 61, which covers the distal end face and the outer surface of a ceramic core rod 55 constituting an electrode 60. A lead 65 of a signal lead wire is inserted in a hole formed in the tongue 63, and is soldered therewith.

In the above embodiment and modifications, the core rod constituting the electrode has a columnar shape. However, the core rod may be tapered or may have any shape.

Figure 15:
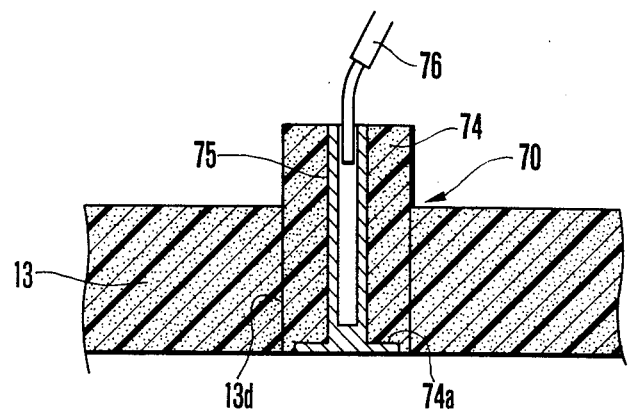

FIG. 15 shows still another modification of the electrode. A semi-sintered or sintered ceramic core rod 74 constituting an electrode 70 is cylindrical, and a conductive portion 75 is formed inside the core rod 74. The conductive portion 75 is formed in a recess 74a formed in the cylindrical inner wall of the core rod 74 and in the main portion of the end face of the core rod 74, which is brought into contact with the fluid to be measured. As a result, the conductive portion 75 seals the core rod 74 cylindrical portion near the fluid to be measured. Reference numeral 76 denotes a lead wire, which is inserted in a hole opposite the coated outer end portion of the core rod 74, and which is brazed or soldered with the outer end portion.

With the above structure, the amount of metal used to form the electrode can be decreased, and the diameter of the electrode can be increased. The ceramic core rod 74 constituting the electrode 70 car be in direct contact with the hole 13d formed in the ceramic pipe 13, and the core rod 74 can be firmly coupled to the ceramic pipe 13 upon sintering. In addition, since the conductive portion 75 is located inside the core rod 74, the influence of temperature changes can be minimized. If a semi-sintered ceramic core rod is used, the material must have a low shrinkage rate. In other words, the semi-sintering temperature of the core rod must be lower than that of the ceramic pipe 13.

A method of manufacturing a measuring portion of the electromagnetic flowmeter having the above structure will now be described.

A platinum paste is applied to the inner surface of a ceramic sintered cylinder 74 serving as a core rod of the electrode 70 and the end face thereof (74 side) contacting the fluid to be measured, and is sintered at a temperature of 800° to 1,600° C. to prepare the electrode 70. In this case, the opening of the ceramic cylinder 74 which is meant to be in contact with the measuring fluid, including the recess 74a, is sealed with platinum. In this state, each electrode 70 is inserted in the corresponding hole 13d of the non-sintered or semi-sintered ceramic pipe 13 and is sintered at a temperature of 1,000° to 1,600° C., thereby preparing a measuring portion of the electromagnetic flowmeter.

According to the method of manufacturing the measuring pipe of this embodiment, the electrode 70 is formed and is inserted in the hole 13d of the non-sintered ceramic pipe 13. Thereafter, the electrode 70 is sintered and fixed to the ceramic pipe 13. Alternatively, the sintered ceramic cylinder 74 may be inserted in the hole 13d, and the ceramic pipe 13 may be sintered. Thereafter, a platinum paste may be applied to the inner surface and the fluid contact end face of the ceramic cylinder 74, thereby forming the electrode 70. In this case, the metal used for the conductive portion 75 must have a lower melting point than that of platinum, thereby reducing the material cost.

Figure 16:
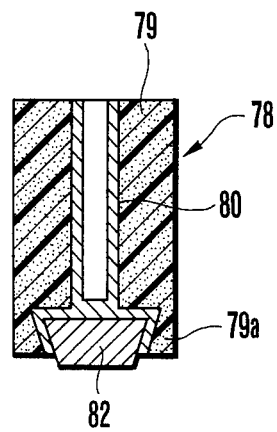

FIG. 16 shows a modification of FIG. 15. An inverted wedged-shaped recess 79a is formed at the fluid contact end face of a cylindrical ceramic core rod 79. A conductive portion 80 is formed in the recess 79a and on the inner surface of the core rod 29. In this case, a hole portion near the recess 79a in the core rod 79 is sealed by the conductive portion 80. A platinum-iridium alloy conductive tip 82 is fitted and fixed in the recess 79a. The core rod 79 is semi-sintered or sintered before it is mounted in the ceramic pipe 13 (not shown in FIG. 16). Formation of the conductive portion 80 and mounting of the conductive tip 82 are performed before the electrodes and the ceramic pipe are sintered.

Figure 17:
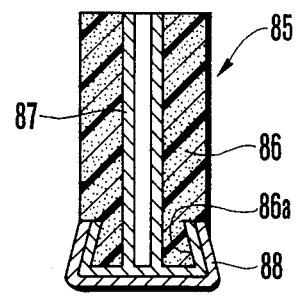

FIG. 17 shows another modification of FIG. 15. A notch 86a is formed on the outer surface of the fluid contact end portion of a cylindrical ceramic core rod 86. The inner surface of the core rod 86, the fluid contact end face, and the notch are covered with a conductive portion 87. The conductive portion which covers the fluid contact end face and the notch is covered with a platinum-iridium alloy conductive cap 88. In the same manner as in FIG. 16, the core rod 86 is semi-sintered or sintered before it is mounted in the ceramic pipe 13 (not shown in FIG. 17), and formation of the conductive portion 87 and mounting of the conductive cap 88 are performed before the electrodes and the ceramic pipe are sintered.

Figures 18, 19:
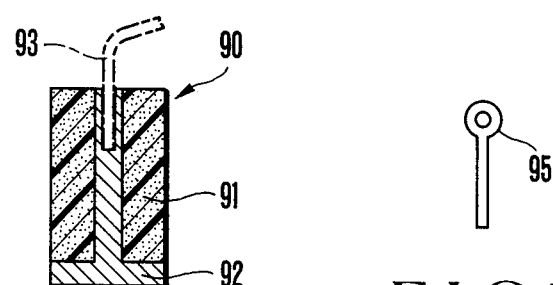

FIG. 18 shows still another modification of the electrode. A hole of a cylindrical ceramic core rod 91 constituting an electrode 90 is filled with a conductive portion 92, and a fluid contact end face of the ceramic core rod 91 is covered with the conductive portion 92. In this case, as indicated by the broken line in FIG. 18, a lead 93 of the lead wire can be inserted in a hole of the core rod 91 during formation of the conductive portion 92. Alternatively, a platinum terminal 95 for connecting the signal lead wire may be inserted in the hole in the core rod 91 during formation of the conductive portion 92, as shown in FIG. 19.

Figure 20:
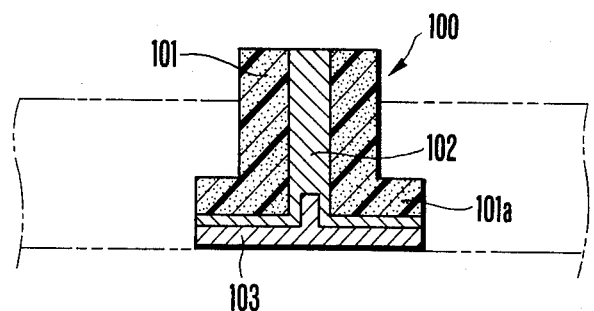

FIG. 20 shows still another modification of the electrode. A core rod 101 constituting an electrode 100 is a ceramic cylinder as in the previous modifications. Since the ceramic cylinder can be easily tooled, a fluid contact end portion is flanged to form a step 101a. Reference numeral 102 denotes a conductive portion formed on the fluid contact end face and in the hole thereof; and 103, a conductive tip brazed or compressively inserted in the conductive portion 102 formed on the end face of the core rod 101. The material of the conductive tip can be arbitrarily selected according to the properties of the fluid to be measured.

Figure 21:
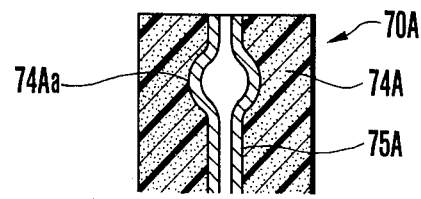

FIG. 21 shows a further modification of FIG. 15. Only the main part of an electrode 70A is illustrated. A recess 74Aa is formed inside a cylindrical core rod 74A. The recess 74Aa serves as a locking portion upon insertion of a banana jack or a banana plug in the cylindrical core rod 74A. A conductive portion 75A is then formed, as shown in FIG. 21. With this structure, the banana jack or plug can be directly inserted in the electrode 70A. Therefore, the signal lead wire need not be soldered or brazed directly to the electrode.

The present invention is not limited to the particular embodiment and modifications described above, and various changes and modifications may be made within the spirit and scope of the invention.

What is claimed is:

1. An electromagnetic flowmeter comprising:
a ceramic main member having a hollow interior and an electrode aperture; and
an electrode directly secured within said electrode aperture and forming a shrink-fitted fluid tight seal therewith, said electrode comprising a ceramic core member having a first end exposed to said hollow interior and a second end and a conductive member fabricated from a refractory metal, said conductive member covering substantially all of said first end of said core member and extending toward said second end of said core member.

2. A flowmeter according to claim 1, wherein said conductive member covers said first end of said core member and the outer surface of said core member.

3. A flowmeter according to claim 2, further including a conductive head mounted on said conductive member adjacent said first end of said core member.

4. A flowmeter according to claim 2, further including a conductive cap mounted on said conductive member adjacent said first end of said core member.

5. A flowmeter according to claim 2, wherein said first end of said core member has a smaller width than that of the remaining portion thereof.

6. A flowmeter according to claim 2, wherein said first end of said core member has a larger width than that of the remaining portion thereof.

7. A flowmeter according to claim 1, wherein said conductive member terminates adjacent said second end of said core member and is provided with a terminal portion connected to a signal lead wire.

8. A flowmeter according to claim 7, wherein said terminal portion is formed on an outer surface of said conductive member adjacent the outer surface of said ceramic main member.

9. A flowmeter according to claim 7, wherein said second end of said core member is located adjacent the outer surface of said ceramic main member, and wherein said terminal portion is located adjacent said second end of said core member.

10. A flowmeter according to claim 1, wherein said conductive member extends beyond said second end of said core member and above the outer surface of said ceramic main member; and wherein said conductive member is provided with a terminal portion located above the outer surface of said ceramic main member and connected to a signal lead wire.

11. A flowmeter according to claim 1, wherein
said core member comprises a cylinder having a hollow interior and wherein
said conductive member extends from said first end of said core member through said hollow interior of said cylinder toward said second end.

12. A flowmeter according to claim 11, wherein a recess is formed in said first end of said core member, and wherein a portion of said conductive member is located in said recess.

13. A flowmeter according to claim 11, wherein said conductive portion covers the entire first end of said core member.

14. A flowmeter according to claim 12, wherein the portion of said conductive member located in said recess forms a second recess, and wherein a conductive tip is located in said second recess.

15. A flowmeter according to claim 11, wherein said conductive member occupies substantially all of said hollow interior of said core member.

16. A flowmeter according to claim 11, further including a conductive cap mounted to said first end of said core member.

17. A flowmeter according to claim 15, wherein said conductive member has a hollow central portion opening outwardly with respect to said ceramic main member, and wherein one end of a signal lead wire is received in said hollow central portion of said conductive member.

18. A flowmeter according to claim 15, wherein said conductive member has a hollow central portion opening outwardly with respect to said ceramic main member, and wherein a terminal connected to a signal lead wire is received in said hollow central portion of said conductive member.

19. A flowmeter according to claim 11, wherein said conductive member includes a lock portion formed in the interior thereof for receiving a plug or jack insertable therein.

20. A flowmeter according to claim 11, wherein said first end of said core member has a larger width than the remaining portions thereof.

21. A flowmeter according to claim 20, wherein said conductive member covers the entire first end of said core member.

22. A flowmeter according to claim 21, further including a conductive tip coupled to said conductive member adjacent said first end of said core member.

* * * * *